(12) United States Patent
Jung et al.

(10) Patent No.: US 8,934,070 B2
(45) Date of Patent: Jan. 13, 2015

(54) BACKLIGHT ASSEMBLY AND LIQUID CRYSTAL DISPLAY HAVING THE SAME

(75) Inventors: Sung Soo Jung, Suwon-si (KR); Eun Serb An, Yongin-si (KR); Hyun Jun Jung, Suwon-si (KR); Dae Hyoun Byoun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1380 days.

(21) Appl. No.: 12/611,142

(22) Filed: Nov. 3, 2009

(65) Prior Publication Data

US 2010/0165253 A1    Jul. 1, 2010

(30) Foreign Application Priority Data

Dec. 29, 2008  (KR) .................. 10-2008-0135696
Aug. 31, 2009  (KR) .................. 10-2009-0081669

(51) Int. Cl.
*G02F 1/13357*    (2006.01)
*F21V 8/00*    (2006.01)

(52) U.S. Cl.
CPC ............ *G02B 6/0091* (2013.01); *G02B 6/0088* (2013.01)
USPC .............. 349/65; 349/58; 362/97.3; 362/612; 362/615

(58) Field of Classification Search
CPC ............... G02F 1/133603; G02F 1/133608; G02F 1/133615; G02F 2001/133314; G02F 2001/133322; G02B 6/0073; G02B 6/0088; G02B 6/0091
USPC .............. 349/33, 58, 65; 362/97.2, 97.3, 612, 362/615, 621, 632, 633
See application file for complete search history.

(56) References Cited

U.S. PATENT DOCUMENTS

| | | | |
|---|---|---|---|
| 5,153,705 A | 10/1992 | Fukuta et al. | |
| 7,161,642 B2 * | 1/2007 | Kim et al. | 349/58 |
| 2003/0223020 A1 | 12/2003 | Lee | |
| 2006/0007708 A1 * | 1/2006 | Lee | 362/632 |
| 2006/0203519 A1 | 9/2006 | Shin et al. | |
| 2006/0285030 A1 * | 12/2006 | Kim | 349/58 |
| 2007/0159806 A1 * | 7/2007 | Fujino et al. | 362/97 |
| 2008/0186427 A1 * | 8/2008 | Kim et al. | 349/62 |
| 2008/0252796 A1 * | 10/2008 | Miyamoto | 348/790 |
| 2009/0103328 A1 * | 4/2009 | Iwasaki | 362/617 |
| 2010/0045898 A1 * | 2/2010 | Lee et al. | 349/65 |
| 2010/0165233 A1 * | 7/2010 | Jung | 349/58 |

FOREIGN PATENT DOCUMENTS

| | | |
|---|---|---|
| JP | 11-084351 | 3/1999 |
| TW | 200500733 | 1/2005 |
| TW | 200508724 | 3/2005 |

OTHER PUBLICATIONS

Computer English translation of JP 11-084351, Mar. 1999, pp. 1-4.*
Taiwan Office Action dated Nov. 12, 2012 issued in TW Application No. 098140965.
Extended European Search Report issued in Application No. 09175355.8 on Dec. 18, 2013.

* cited by examiner

*Primary Examiner* — Dung Nguyen
*Assistant Examiner* — Tai Duong
(74) *Attorney, Agent, or Firm* — Staas & Halsey LLP

(57) ABSTRACT

Disclosed are a backlight assembly including a light guide plate having at least one slit, at least one light source unit disposed at a side of the light guide plate, and a lower cover which accommodates the light source unit and has at least one support coupled with the at least one slit.

31 Claims, 11 Drawing Sheets

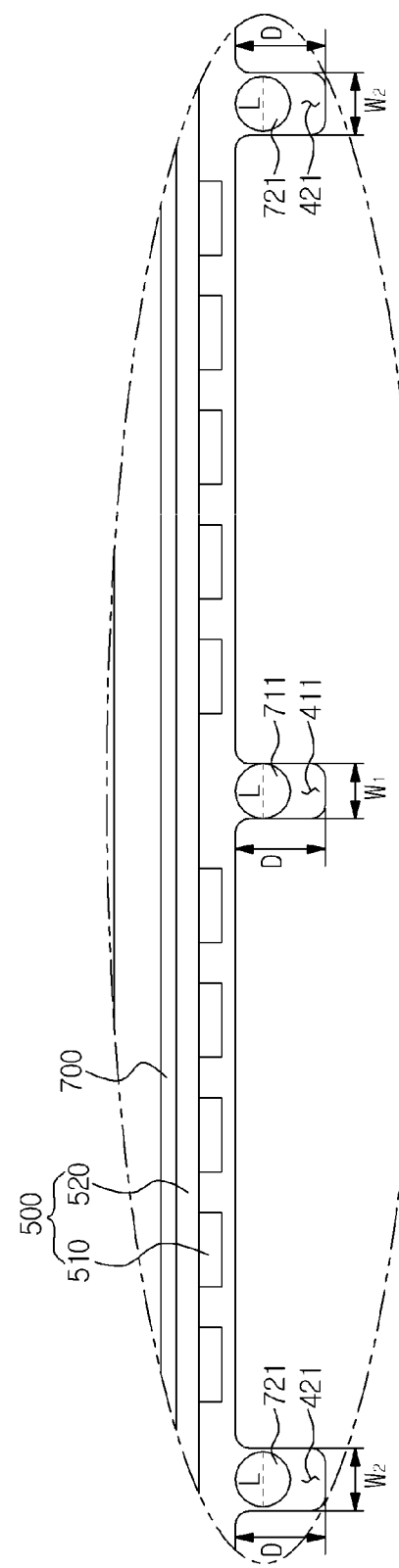

BACKLIGHT ASSEMBLY AND LIQUID CRYSTAL DISPLAY HAVING THE SAME

CROSS-REFERENCE TO RELATED APPLICATIONS

This application claims priority from Korean Patent Applications No. 10-2008-0135696 filed on Dec. 29, 2008, and No. 10-2009-0081669 filed on Aug. 31, 2009 in the Korean Intellectual Property Office, the disclosure of which is incorporated herein by reference.

BACKGROUND

1. Field of the Invention

Exemplary embodiments of the present invention relate to a backlight assembly and a liquid crystal display having the same, and more particularly, to a backlight assembly capable of preventing a light guide plate from heat generated from a light source unit, and a liquid crystal display having the same.

2. Description of the Related Art

A Liquid Crystal Display (LCD) displays images using electrical and optical properties of liquid crystal. Since the LCD has advantages of slimness, lightweight, low power consumption and low driving voltage as compared with other display apparatuses, the LCD has been extensively employed in various industrial fields.

The LCD includes a liquid crystal display panel, in which liquid crystal is interposed between two transparent substrates and voltage is applied to the liquid crystal to change a direction of liquid crystal molecules to optically display images, and a backlight assembly for providing light to the liquid crystal display panel.

A Cold Cathode Fluorescent Lamp (CCFL), an External Electrode Fluorescent Lamp (EEFL), and a Flat Fluorescent Lamp (FFL) are all examples of possible light sources of a backlight assembly. However, the CCFL represents limitations in terms of high definition, light weight, slim structure and compact size, so a Light Emitting Diode (LED) has been recently used as the light source of the backlight assembly because the LED represents improved performance such as high brightness, long life span and high color purity. In addition, as restriction on dumping of dangerous substances such as mercury has been reinforced, the CCFL is less used, and the LED, which is a more environmental friendly device, is becoming more widely used instead of the CCFL.

The backlight assembly having such an LED as the light source is classified into a direct-type backlight assembly and an edge-type backlight assembly according to the arrangement of the LED and the type of the light guide plate. The direct-type backlight assembly having the LED has a structure in which the LED is disposed in front of the backlight assembly, so the direct-type backlight assembly has a difficulty in achieving slimness and requires a large number of LEDs, increasing the manufacturing cost.

In contrast, the edge-type backlight assembly has a structure in which the LED is mounted at both sides of the backlight assembly and light is introduced into the front surface of the backlight assembly through a light guide plate, so the edge-type backlight assembly may have a thickness smaller than that of the direct-type backlight assembly, thereby realizing the slimness structure.

However, in the edge-type backlight assembly, the light guide plate may be contracted or expanded widthwise along the light guide plate due to thermal deformation. Consequently, the light guide plate may be damaged due to excessive heat.

SUMMARY

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An exemplary aspect of the present invention provides a backlight assembly and a liquid crystal display having the same, capable of preventing a light guide plate from being damaged by supporting the light guide plate, which is deformed due to heat generated from a light source unit.

Additional exemplary aspects of the present invention will be set forth in part in the description which follows and, in part, will be apparent from the description, or may be learned by practice.

The foregoing and/or other exemplary aspects of the disclosure may be achieved by providing a backlight assembly including a light guide plate having a first slit, at least one light source unit disposed at a side of the light guide plate, and a lower cover, which accommodates the light source unit and has a first support formed to be coupled with the first slit.

The first slit may be provided at an upper edge and a lower edge of the light guide plate. The first support may be provided at an upper edge and a lower edge of the lower cover formed to be coupled with the first slit.

The light guide plate may further include a second slit provided at a left edge and a right edge of the light guide plate. The lower cover may further include a second support which is provided at a left edge and a right edge of the lower cover formed to be coupled with the second slit.

The first slit may be formed at a position corresponding to a half of a transverse length of the light guide plate and the second slit may be formed at a position corresponding to a half of a longitudinal length of the light guide plate.

The first support may have a diameter substantially identical to a width of the first slit to prevent the light guide plate from moving in left and right directions.

The second support may have a diameter substantially identical to a width of the second slit to prevent the light guide plate from moving in upper and lower directions.

The first and second supports may be provided in a cylindrical shape and protrudes from a bottom surface of the lower cover at a predetermined height.

A reflection sheet may be provided between the light guide plate and the lower cover.

The light guide plate may further include at least one sub-slit and the lower cover may further include at least one sub-support formed to be coupled with the sub-slit.

The sub-support may have a diameter smaller than a width of the sub-slit.

According to another aspect of the present invention, there is provided a backlight assembly including a light guide plate provided at an edge thereof with at least one slit, at least one light source unit disposed at a side of the light guide plate, and at least one support unit formed to be coupled with the at least one slit.

According to another exemplary aspect of the present invention, there is provided a liquid crystal display including a liquid crystal display panel to display an image, and a backlight assembly to provide light to the liquid crystal display panel. The backlight assembly may include a light guide plate having a first slit, at least one light source unit disposed at a side of the light guide plate and a lower cover which accommodates the light source unit and has a first support formed to be coupled with the first slit.

The light guide plate may further include a second slit, and the first and second slits may be formed in an edge of a long side and a short side of the light guide plate, respectively. The lower cover may further include a second support, and the first and second supports may be coupled with the first and second slits, respectively.

The first slit may be formed at a position corresponding a half of a length of the long side and the second slit may be formed at a position corresponding to a half of a length of the short side, respectively.

A sub-slit may be formed in the light guide plate at a position corresponding to a half of a length of the half of the length of the short side, and a sub-support formed to be coupled with the sub-slit may be provided on the lower cover.

According to a further exemplary aspect of the present invention, there is provided a display device including a signal processing unit processing image signals and audio signals received from the outside, a liquid crystal panel displaying the image signals supplied from the signal processing unit, and a backlight assembly supplying light to the liquid crystal panel, wherein the backlight assembly comprises a light guide panel having at least one cut part, at least one light source unit arranged on lateral sides of the light guide panel, and a lower cover accommodating the light source unit and having at least one support coupled with the slit of the cut part.

BRIEF DESCRIPTION OF THE DRAWINGS

These and/or other aspects of the disclosure will become apparent and more readily appreciated from the following description of the exemplary embodiments, taken in conjunction with the accompanying drawings of which:

FIGS. 7A and 7B are enlarged views showing a part of the backlight assembly of FIG. 6

DETAILED DESCRIPTION OF THE EMBODIMENTS

Figure 1:
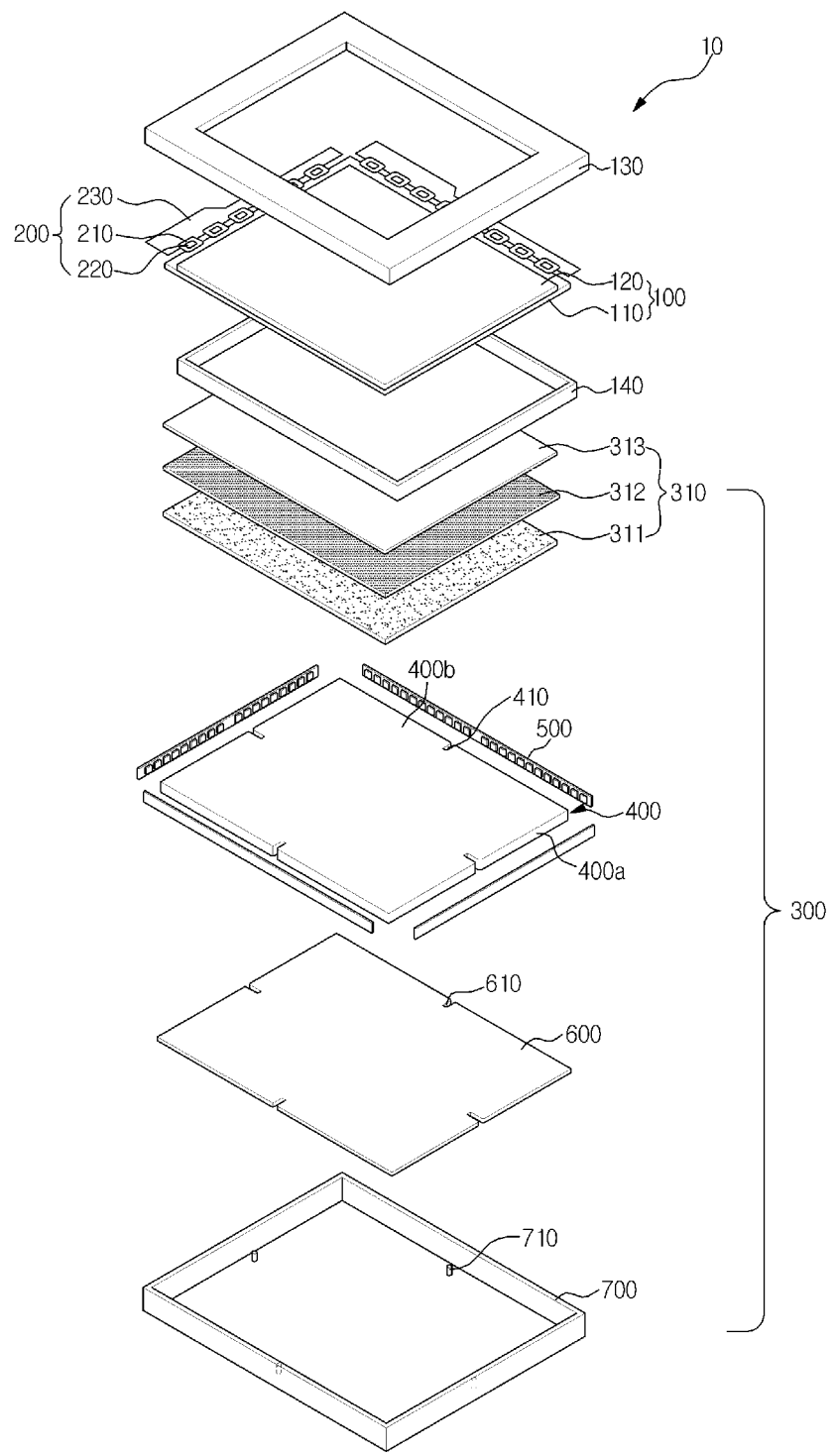
FIG. 1 is a perspective view showing a liquid crystal display according to a first exemplary embodiment.

Reference will now be made in detail to the exemplary embodiments of the disclosure, examples of which are illustrated in the accompanying drawings, wherein like reference numerals refer to the like elements throughout. The exemplary embodiments are described below to explain the disclosure by referring to the figures.

Figure 2:
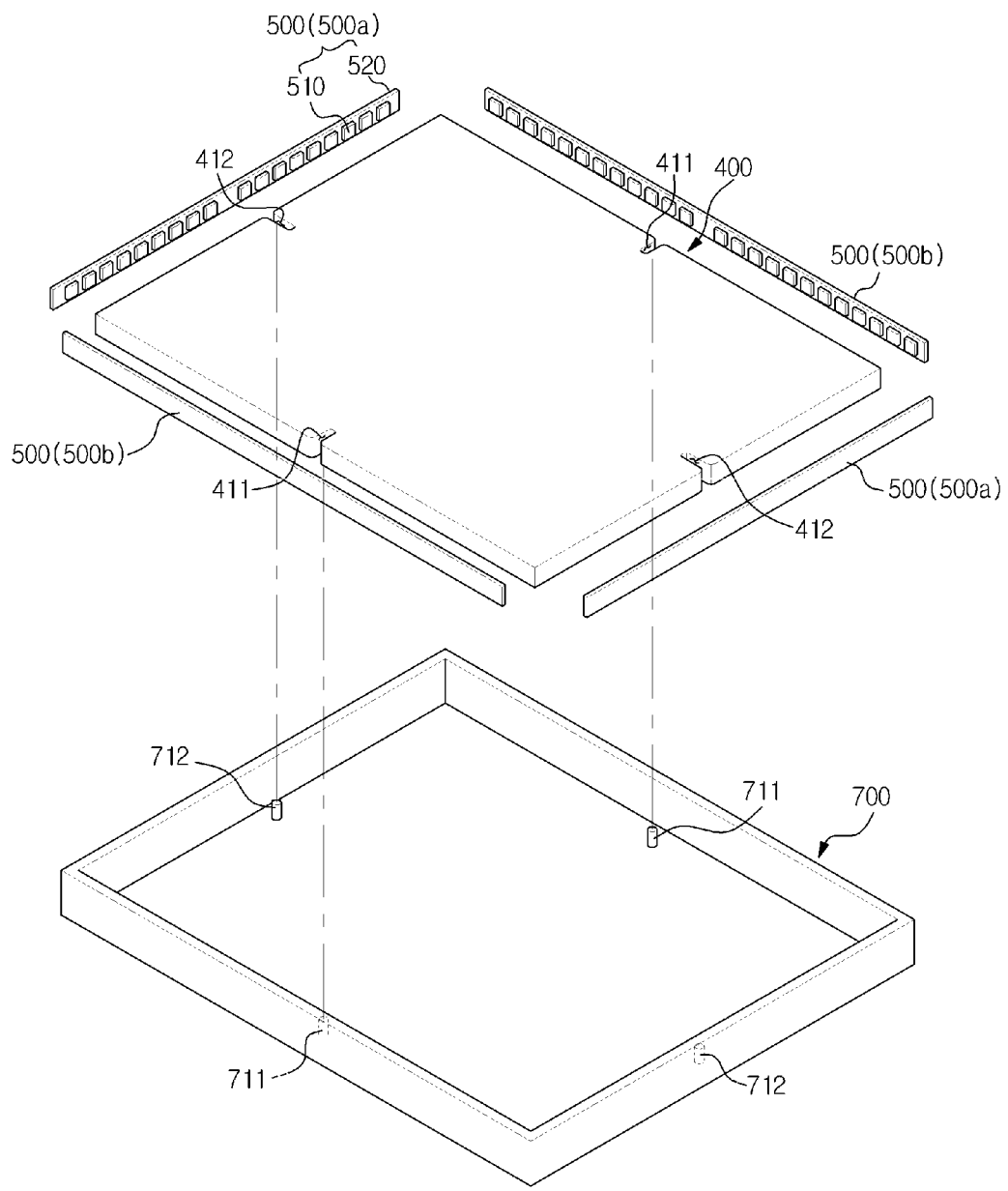
FIG. 2 is a perspective view showing a part of the liquid crystal display of FIG. 1.

As shown in FIGS. 1 and 2, a liquid crystal display 10 according to a first exemplary embodiment includes a liquid crystal display panel 100 to form an image, a driver 200 which is connected to one side of the liquid crystal display panel 100 to drive the liquid crystal display panel 100 and a backlight assembly 300 which is disposed at a rear surface of the liquid crystal display panel 100 to radiate light to the liquid crystal display panel 100.

A periphery of the liquid crystal display panel 100 is supported by a mold frame 140. Such a mold frame 140 and the backlight assembly 300 are coupled to an upper cover 130 which covers a front surface of the liquid crystal display panel 100.

The liquid crystal display panel 100 includes a thin film transistor substrate 110, a color filter substrate facing the thin film transistor substrate 110, and liquid crystal (not shown) injected between the thin film transistor substrate 110 and the color filter substrate 120. The liquid crystal display panel 100 forms an image by adjusting transmittance of light passing through liquid crystal cells according to image signal information, which is transmitted from the driver 200.

The driver 200 is provided at one side of the thin film transistor substrate 110 to apply a drive signal to the liquid crystal display panel 100. The driver 200 includes a flexible printed circuit board 210, a drive chip 220 mounted on the flexible printed circuit board 210 and a circuit board 230 connected to one side of the flexible printed circuit board 210.

The backlight assembly 300 is disposed at the rear surface of the liquid crystal display panel 100. The backlight assembly 300 includes optical sheets 310 which are stacked on the rear surface of the liquid crystal display panel 100 to diffuse and collect light, a light guide plate 400 disposed at a rear surface of the optical sheets 310, a light source unit 500, which is provided along at least one side of the light guide plate 400 to guide light to the liquid crystal display panel 100, a reflection sheet 600 provided at a rear surface of the light guide plate 400 and a lower cover 700 for fixedly accommodating the light guide plate 400.

The optical sheets 310 are disposed in parallel to the rear surface of the liquid crystal display panel 100 and include a diffusion sheet 311, a prism sheet 312 and a protection sheet 313 that are sequentially stacked up. The diffusion sheet 311 includes a base film (not shown) and a diffusion coating layer (not shown) formed on the entire surface of the base film. The diffusion sheet 311 diffuses light from the light source unit 500 to provide the light to the liquid crystal display panel 100.

The prism sheet 312 and the protection sheet 313 are provided on the diffusion sheet 311. The prism sheet 312 is provided at an upper surface thereof with triangular prisms regularly arranged such that light passing through the diffusion sheet 311 is vertically directed, thereby improving light brightness. The protection sheet 313 is provided on the prism sheet 312 to prevent damage due to external impact and impurities. The protection sheet 313 protects the diffusion sheet 311 and the prism sheet 312 that are sensitive to dust and scratch.

The light guide plate 400 is provided in a rectangular shape having a predetermined thickness. The light guide plate 400 includes an incident surface 400a facing the light source unit 500 to receive light discharged from the light source unit 500, an exit surface 400b to discharge light introduced through the incident surface 400a, and a reflection surface (not shown) facing the exit surface 400b. The light guide plate 400 includes Poly Methyl Metha Acrylate (PMMA), which has superior strength against deformation and breakage and has superior transmittance.

The light source unit 500 is disposed along the incident surface 400a provided at one side of the light guide plate 400.

The light source unit 500 may include a Light Emitting Diode (LED) 510 and a circuit board 520 to apply an electric signal to the LED 510.

Figure 3:
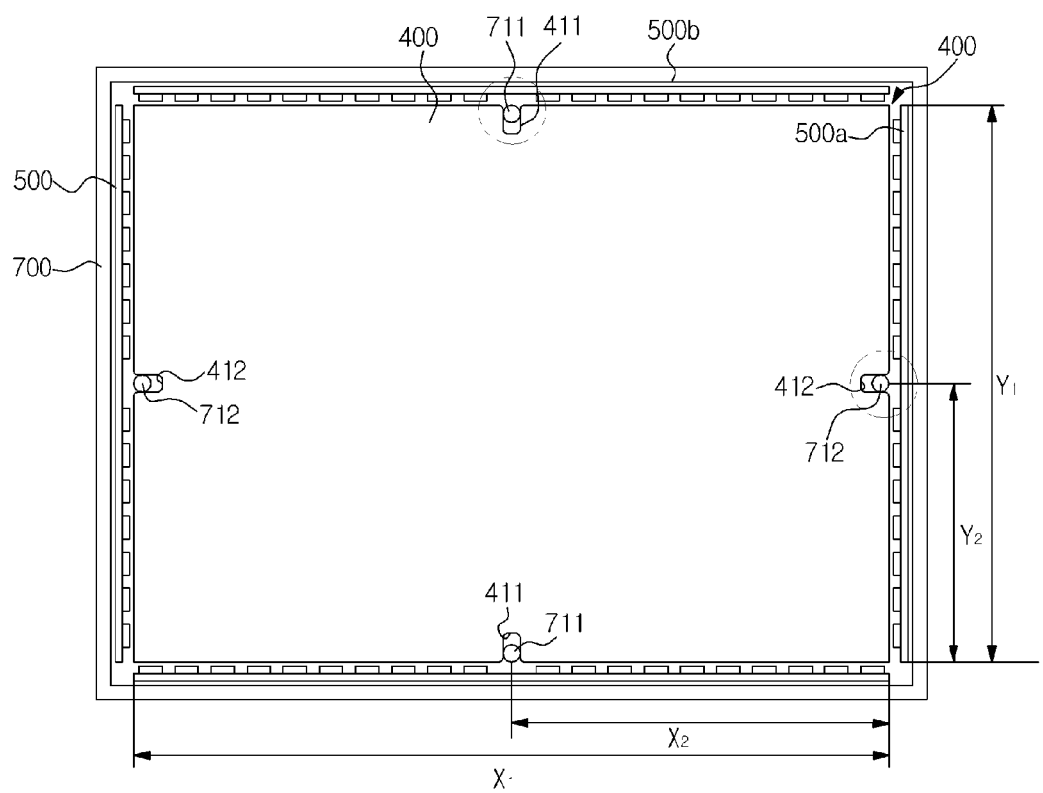
FIG. 3 is a plan view showing a backlight assembly according to the first exemplary embodiment.

The light source unit 500 faces at least one side surface of the light guide plate 400, and may be disposed in various positions corresponding to a long side and a short side of the light guide plate 400. That is, as shown in FIGS. 2 and 3, the light source unit 500 is disposed corresponding to both short sides and both long sides of the light guide plate 400. The light source unit 500 includes a first light source unit 500a disposed corresponding to the both short sides of the light guide plate 400 and a second source unit 500b disposed corresponding to the both long sides of the light guide plate 400.

The LED 510 is provided in a square shape. Since the LED 510 emits a great amount of heat, the circuit board 520 mainly includes aluminum having superior thermal conductivity. According to the exemplary embodiment, a plurality of LEDs are arranged on the circuit board 520 at a regular interval. The LED 510 is provided in the form of a white light supply unit, which includes a blue LED, a red LED and a green LED to supply white light.

The reflection sheet 600 reflects light, which is leaked from the light source unit 500 in the direction opposite to the liquid crystal display panel 100, to the light guide plate 400, thereby reducing light loss. The reflection sheet 600 includes polyethyleneterephthalate (PET) or polycarbonate (PC).

The light guide plate 400, the light source unit 500 and the reflection sheet 600 are accommodated in the lower cover 700. As described above, the lower cover 700 is coupled to the mold frame 140 including synthetic resin having insulating characteristics.

In order to fixedly couple the light guide plate 400 to the lower cover 700, a slit 410 is formed in the light guide plate 400, and a support 710 is formed on the lower cover 700. The structure for accommodating the light guide plate 400 in the lower cover 700 will be described with reference to FIGS. 3 and 4. Reference numeral 610 represents a slit formed in the reflection sheet 600 such that the light guide plate 400 is coupled to the lower cover 700.

Figure 4A:
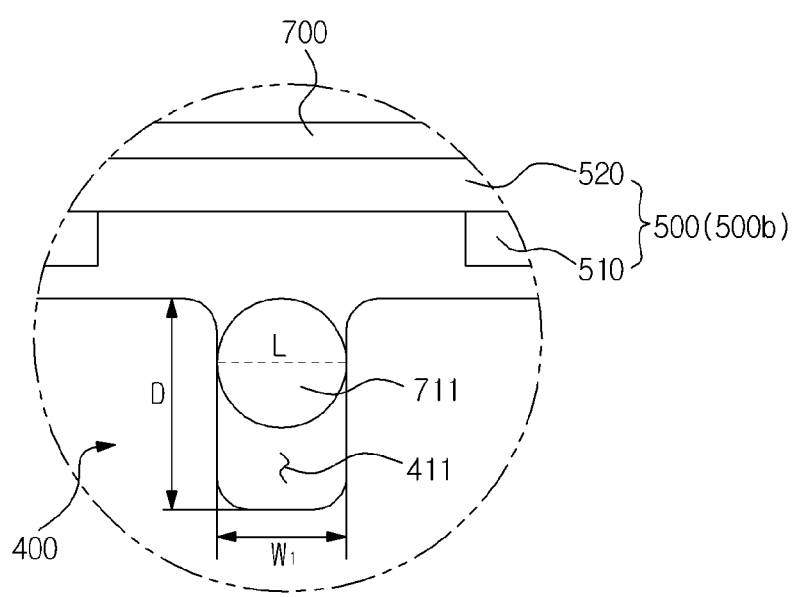
FIGS. 4A and 4B are enlarged views showing a part of the backlight assembly of FIG. 3.
Figure 4B:
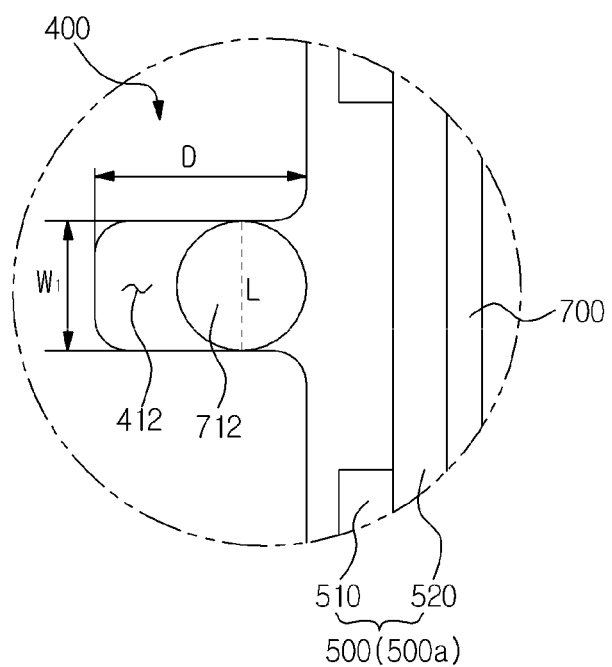

FIG. 3 is a plan view showing a backlight assembly according to the first exemplary embodiment, and FIGS. 4A and 4B are enlarged views showing a part of the backlight assembly of FIG. 3.

As shown in FIGS. 1 to 4, the support 710 corresponding to the slit 410 of the light guide plate 400 is provided on the lower cover 700. The support 710 protrudes from a bottom surface of the lower cover 700. Such a support 710 is provided at a position corresponding to the slit 410 formed in the light guide plate 400. The support 710 is integrally formed with the lower cover 700 through a press or a welding. The support 710 includes a first support 711 formed at a long side of the lower cover 700 and a second support 712 formed at a short side of the lower cover 700.

A first slit 411 is formed in an edge of the long side, which is provided at an upper side and a lower side of the light guide plate 400. The first slit 411 is provided in the form of a groove, which is recessed in one direction and has a predetermined width $W_1$ and depth D. The first slit 411 has a center formed at a position corresponding to about a half length $(X_2)$ of a long side length $(X_1)$ of the light guide plate 400 such that the first slit 411 is fitted with the first support 711 provided on the long side of the lower cover 700.

The first support 711 is provided in a cylindrical shape and protrudes from the bottom surface of the lower cover 700 at a predetermined height. The first support 711 has a diameter L substantially identical to the width $W_1$ of the first slit 411 which is cut in an X axis direction. As used herein, the term "substantially identical" is intended to include both being identical, as well as being substantially identical. The diameter L of the first support 711 is smaller than the depth D of the first slit 411 cut in a Y axis direction.

Accordingly, the first support 711 prevents the light guide plate 400 from moving to the left and right, that is, in the X axis direction, so an interval between the light guide plate 400 and the first light source unit 500a is uniformly maintained when the light guide plate 400 is fixed. In addition, even if the temperature is increased by the first light source unit 500a and the light guide plate 400 expands, the transverse length of the light guide plate 400 is increased from a point of the first support 711. Therefore, the interval between the light guide plate 400 and the first light source unit 500a is uniformly maintained.

Meanwhile, the first support 711 has a thickness substantially identical to the sum of a thickness of the reflection sheet 600 and a thickness of the first slit 411 of the light guide plate 400.

A second slit 412 is formed in an edge of the short side, which is provided at a left side and a right side of the light guide plate 400. The second slit 412 has a center formed at a position corresponding to about a half length $(Y_2)$ of a short side length $(Y_1)$ of the light guide plate 400, and is fitted with the second support 712 provided on the short side of the lower cover 700.

The second support 712 is provided in a cylindrical shape and protrudes from the bottom surface of the lower cover 700 at a predetermined height. The second support 711 has a diameter L smaller than a depth D of the second slit 412 cut in the X axis direction. The diameter L of the second support 712 is the same as a width $W_1$ of the second slit 412 cut in the Y axis direction.

Accordingly, the second support 712 prevents the light guide plate 400 from moving up and down, that is, in the Y axis direction. Therefore, when the light guide plate 400 is fixed, an interval between the light guide plate 400 and the second light source unit 500b is uniformly maintained. In addition, even if the temperature is increased by the second light source unit 500b and the light guide plate 400 expands, the longitudinal length of the light guide plate 400 is increased from a point of the second support 712. Therefore, the interval between the light guide plate 400 and the second light source unit 500b is uniformly maintained.

Meanwhile, the second support 711 has a thickness the same as the sum of a thickness of the reflection sheet 600 and a thickness of the second slit 412 of the light guide plate 400.

The first and second slits 411 and 412 according to the present exemplary embodiment are formed in the long side and the short side of the light guide plate 400 through laser or a drill. However, according to another exemplary embodiment, the first and second slits may be formed through various schemes other than the laser and the drill.

Meanwhile, according to the backlight assembly 300 of the first exemplary embodiment, four slits are formed at edges of the upper side, the lower side, the left side and the right side of the light guide plate 400, respectively, and four supports are formed at edges of the upper side, the lower side, the left side and the right side of the lower cover 700, respectively. However, this configuration is based on the relative position of the first light source unit 500a and the second light source unit 500b. Accordingly, if the backlight assembly has one of the first light source unit 500a and the second light source unit 500b, only two slits and two supports are formed on the upper and lower sides or the left and right sides corresponding to the light source unit provided on the backlight assembly.

Additionally, it should be noted that while the above exemplary embodiments show the first and second slits and first and second supports located at about a half length of their respective sides, the present invention is not limited to this specific configuration.

Figure 5:
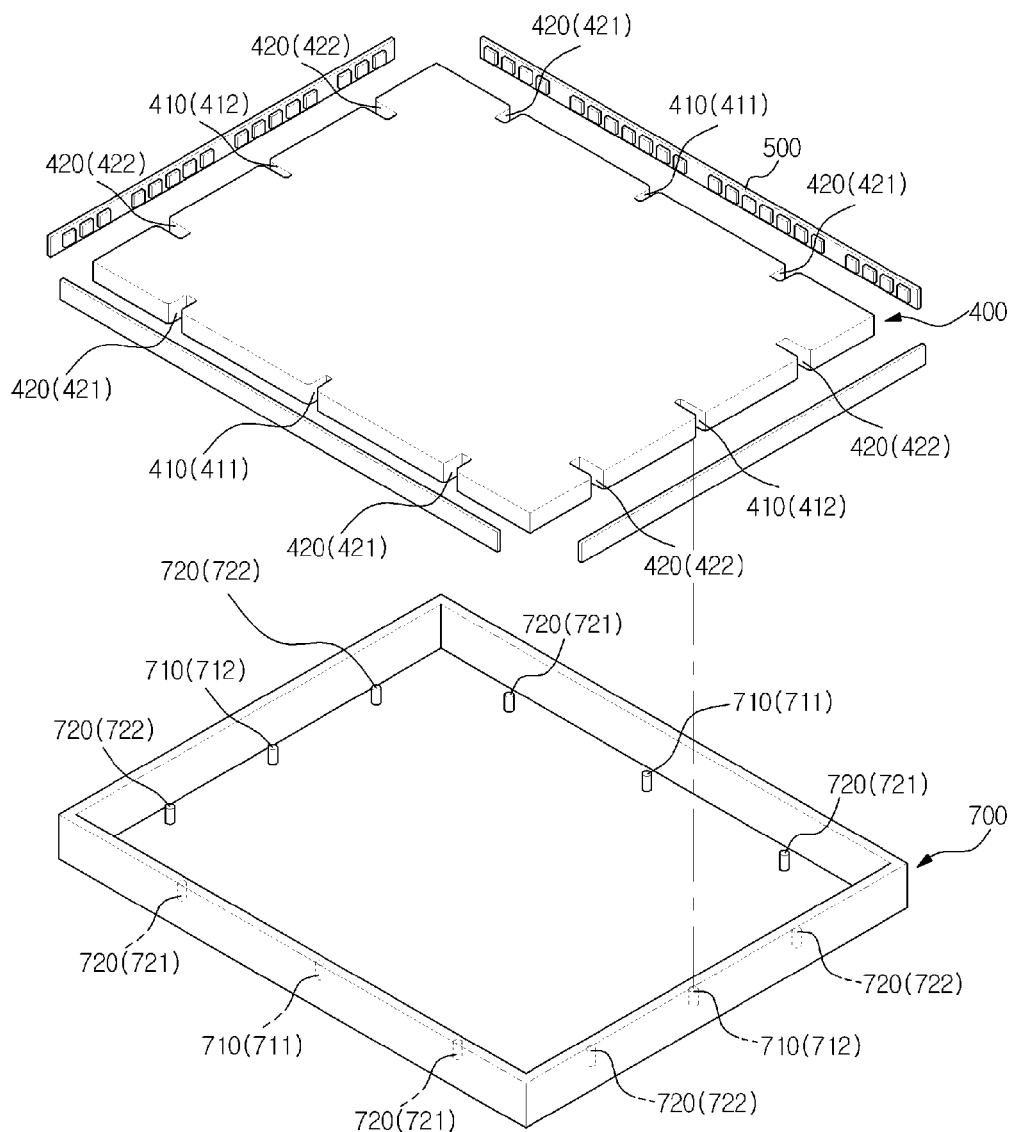
FIG. 5 is a perspective view showing a backlight assembly according to a second exemplary embodiment.

Hereinafter, a backlight assembly according to the second exemplary embodiment will be described with reference to FIGS. 5 to 7. In the following description, the same reference numerals will be assigned to the same elements and the details of the elements will be omitted in order to avoid redundancy. FIG. 5 is a perspective view showing the backlight assembly according to the second exemplary embodiment, FIG. 6 is a plan view showing the backlight assembly of FIG. 5, and FIGS. 7A and 7B are enlarged views showing a part of the backlight assembly of FIG. 6.

Figure 6:
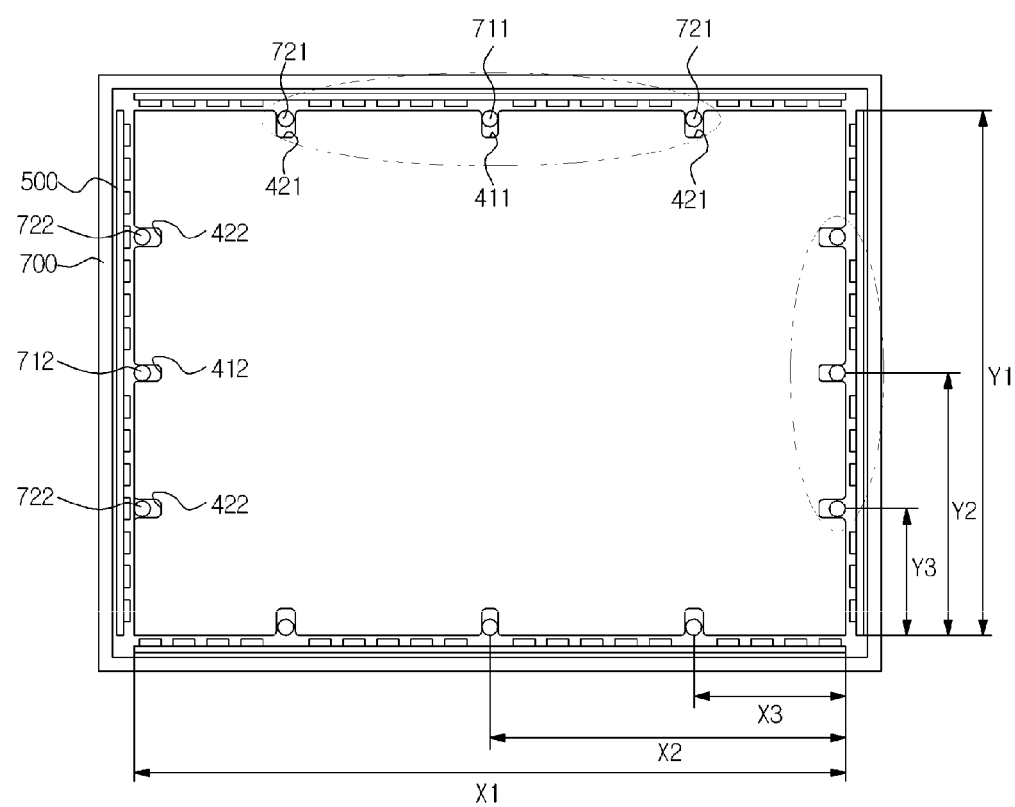
FIG. 6 is a plan view showing the backlight assembly of FIG. 5.
Figure 7B:
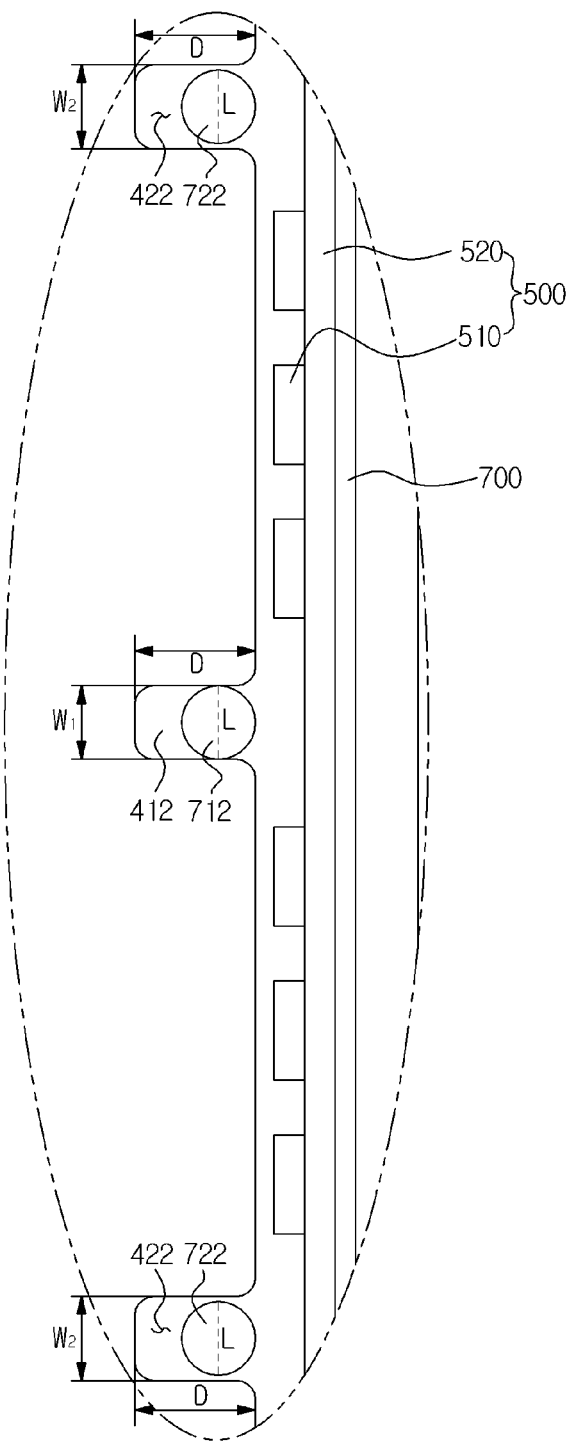

As shown in FIGS. 5 to 7, the lower cover 700 is further provided with a sub-support 720 corresponding to a sub-slit 420 of the light guide plate 400. The sub-support 720 protrudes from the bottom surface of the lower cover 700, and is provided at a position corresponding to the sub-slit 420 formed in the light guide plate 400. The sub-support 720 includes a first sub-support 721 formed in the long side of the lower cover 700 and a second sub-support 722 formed in the short side of the lower cover 700.

A first sub-slit 421 is formed in the edge of the long side of the light guide plate 400. The first sub-slit 421 is provided in the form of a groove, which is recessed in one direction and has a predetermined width $W_2$ and a depth D. The first sub-slit 421 has a center formed at a position corresponding to about a half length ($X_3$) of the length ($X_2$), which is about half of the long side length ($X_1$), such that the first sub-slit 421 is fitted with the first sub-support 721 provided on the long side of the lower cover 700. As used herein, the "length" of the slit, e.g., "the length ($X_2$) of the first slit 411," refers to the distance from an endpoint on a side to the center of the slit.

The first sub-support 721 has a diameter L smaller than the width $W_2$ of the first sub-slit 421 cut in the X axis direction. The diameter L of the first sub-support 721 is smaller than the depth D of the first sub-slit 421 cut in the Y axis direction. Accordingly, even if the light guide plate 400 expands due to the temperature increased by the light source unit 500 and the relative position of the first sub-slit 421 is changed in the left and right directions, the first sub-support 721 is prevented from being deformed due to the first sub-slit 421.

A second sub-slit 422 is formed in the edge of the short side of the light guide plate 400. The second sub-slit 422 is provided in the form of a groove, which is recessed in one direction and has a predetermined width $W_2$ and a depth D. The second sub-slit 422 has a center formed at a position corresponding to about a half length ($Y_3$) of the length ($Y_2$), which is about half the short side length ($Y_1$), such that the second sub-slit 422 is fitted with the second sub-support 722 provided on the short side of the lower cover 700.

The second sub-support 722 has a diameter L smaller than the depth D of the second sub-slit 422 cut in the X axis direction. In addition, the diameter L of the second sub-support 722 is smaller than the width $W_2$ of the second sub-slit 422 cut in the Y axis direction. Accordingly, even if the light guide plate 400 expands due to the temperature increased by the light source unit 500 and the relative position of the second sub-slit 422 is changed in the upper and lower directions, the second sub-support 722 is prevented from being deformed due to the second sub-slit 422.

Figure 8:
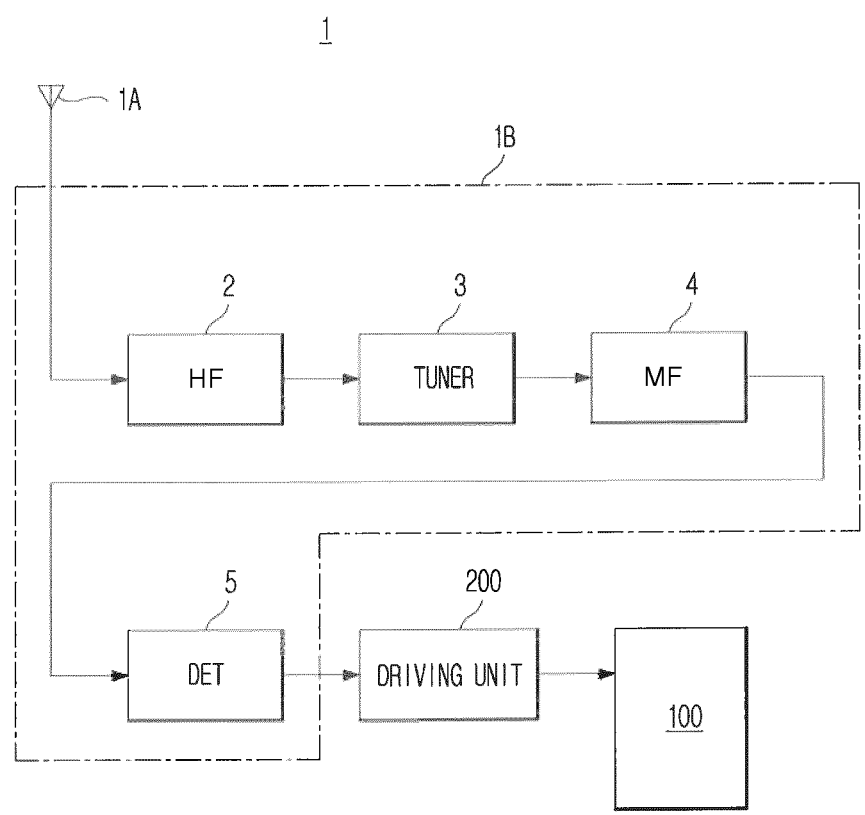
FIG. 8 is a view showing the structure of a TV receiver as a display device applying the LCD according to the embodiments of the present invention.
Figure 9:
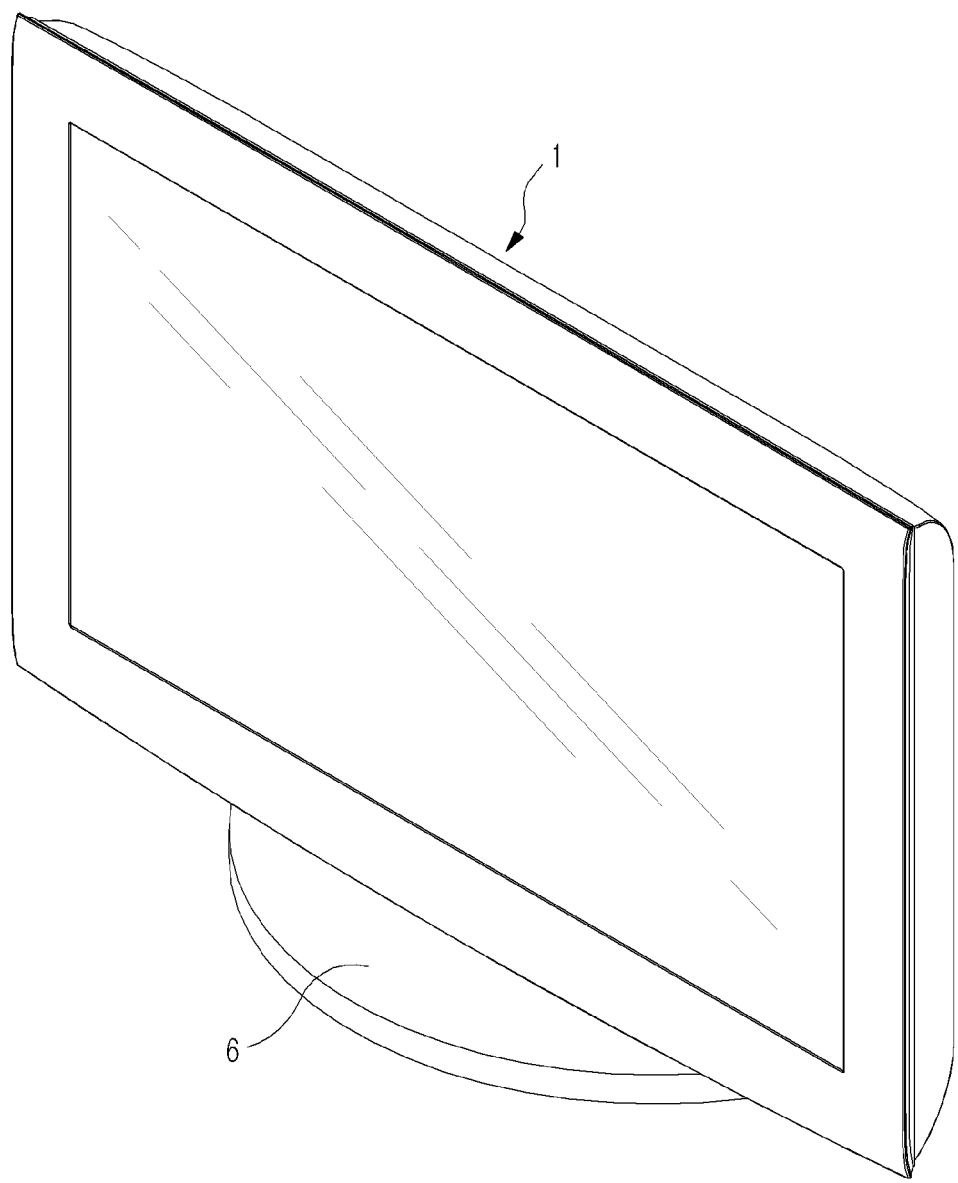
FIG. 9 is a view showing the exterior appearance of the TV receiver.

FIG. 8 is a view showing the structure of a TV receiver as a display device applying the LCD according to the embodiments of the present invention. FIG. 9 is a view showing the exterior appearance of the TV receiver.

As shown in FIGS. 8 and 9, the TV receiver 1 includes a high-frequency (HF) amplifier 2 connected to an antenna 1A to amplify HF signals including image signals such as a wireless signal, to serve as a signal processing unit 1B that processes image signals received from the outside, a tuner unit 3 converting the frequency of a desired channel of the HF signals and thereby forming a medium frequency (MF) signal, and an MF amplifier 4 amplifying the MF signals formed by the tuner 3 while removing signals of the other frequencies, and a detector 5 detecting the MD signals amplified by the MF amplifier 4 and forming image data. The signal processing unit 1B is connected to the driving unit 200 that transmits image signal information to the liquid crystal panel 100.

Although not shown, a switching mode power supply (SMPS) board may be installed at a rear side of the lower cover 700, the SMPS which is connected to the external AC power to supply power to a speaker that outputs audio signals, the signal processing unit 1B, other parts of the electric circuit, and the liquid crystal panel 100. The SMPS board may be installed at a stand 6 supporting the display device 1 according to the embodiments of the present invention.

Additionally, it should be noted that while the above exemplary embodiments show the first and second sub-slits and first and second supports located at about half length between the lengths of the first and second slits, respectively, the present invention is not limited to this specific configuration.

In the backlight assembly and the liquid crystal display having the same, the light guide plate may be supported when the light guide plate is deformed due to contraction and expansion caused by heat from the light source unit, so the light guide plate may be prevented from being damaged.

Although few exemplary embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A backlight assembly comprising:
    a light guide plate having at least one groove, the at least one groove being formed at a position corresponding to a half-length of at least one edge of the light guide plate;
    at least one light source unit disposed at a side of the light guide plate; and
    a lower cover which accommodates the at least one light source unit and has at least one support formed to be directly coupled with the at least one groove and disposed on a same side that the at least one light source unit is disposed.

2. The backlight assembly of claim 1, wherein the at least one groove is provided at an upper edge and a lower edge of the light guide plate, and
    the at least one support is provided at an upper edge and a lower edge of the lower cover and is formed to be coupled with the at least one groove.

3. The backlight assembly of claim 2, wherein the light guide plate further includes a second groove provided at a left edge and a right edge of the light guide plate, respectively, and
    the lower cover further includes a second support which is provided at a left edge and a right edge of the lower cover, respectively, to be coupled with the respective second groove.

4. The backlight assembly of claim 3, wherein the at least one groove is formed at a transverse length of the light guide plate and the second groove is formed at a longitudinal length of the light guide plate.

5. The backlight assembly of claim 2, wherein the at least one support has a diameter substantially identical to a width of the groove to prevent the light guide plate from moving in left and right directions.

6. The backlight assembly of claim 3, wherein the second support has a diameter substantially identical to a width of the second groove to prevent the light guide plate from moving in upper and lower directions.

7. The backlight assembly of claim 1, wherein the at least one support is provided in a cylindrical shape and protrudes from a bottom surface of the lower cover at a predetermined height.

8. The backlight assembly of claim 1, wherein a reflection sheet is provided between the light guide plate and the lower cover.

9. The backlight assembly of claim 1, wherein the light guide plate further includes at least one sub-slit and the lower cover further includes at least one sub-support formed to be coupled with the at least one sub-slit.

10. The backlight assembly of claim 9, wherein the sub-support has a diameter smaller than a width of the sub-slit.

11. The backlight assembly of claim 1, wherein the at least one groove is formed at a position corresponding to a half-length of at least one long edge of the light guide plate.

12. The backlight assembly of claim 11, wherein the at least one support protrudes from a bottom surface of the lower cover and fitted into the at least one groove formed at the at least one long edge of the light guide plate.

13. The backlight assembly of claim 1, wherein the at least one support protrudes from a bottom surface of the lower cover.

14. A backlight assembly comprising:
a light guide plate provided at an edge thereof with at least one groove formed at a position corresponding to a half-length of the edge;
at least one light source unit disposed at a side of the light guide plate; and
at least one support unit protruding from a bottom surface of a lower cover and formed to be directly coupled with the at least one groove,
wherein the at least one groove is formed at a position corresponding to a half-length of at least one long edge of the light guide plate.

15. The backlight assembly of claim 14, wherein the at least one support protrudes from a bottom surface of a lower cover and fitted into the at least one groove formed at the at least one long edge of the light guide plate.

16. A liquid crystal display comprising:
a liquid crystal display panel to display an image; and
a backlight assembly to provide light to the liquid crystal display panel,
wherein the backlight assembly includes a light guide plate having a groove formed at a position corresponding to a half-length of at least one edge of the light guide plate, at least one light source unit disposed at a side of the light guide plate, a lower cover which accommodates the at least one light source unit and has a support protruding from a bottom surface of a lower cover and formed to be directly coupled with the groove, and a second groove, the groove and the second groove being formed in an edge of a long side and a short side of the light guide plate, respectively, and the lower cover further includes a second support, the support and the second support being formed to be coupled with the groove and the second groove, respectively.

17. The liquid crystal display of claim 16, wherein a first sub-slit is formed in the light guide plate at a position corresponding to half of a length of a half of a length of the long side, and
a first sub-support formed to be coupled with the first sub-slit is provided on the lower cover.

18. The liquid crystal display of claim 17, wherein a second sub-slit is formed in the light guide plate at a position corresponding to half of a length of a half of a length of the short side, and
a second sub-support formed to be coupled with the first sub-slit is provided on the lower cover.

19. The backlight assembly of claim 16, wherein the groove is formed at a position corresponding to a half-length of at least one long edge of the light guide plate.

20. The backlight assembly of claim 19, wherein the support protrudes from a bottom surface of the lower cover and fitted into the groove formed at the at least one long edge of the light guide plate.

21. A display device comprising:
a signal processing unit to process image signals received from outside the display device;
a liquid crystal panel to display the image signals supplied from the signal processing unit; and
a backlight assembly supplying light to the liquid crystal panel,
wherein the backlight assembly comprises a light guide panel having at least one groove formed at a position corresponding to a half-length of at least one edge of the light guide panel, at least one light source unit arranged on lateral sides of the light guide panel, and a lower cover accommodating the light source unit and having at least one support directly coupled with the at least one groove and being disposed on a same side that the at least one light source unit is disposed.

22. The backlight assembly of claim 21, wherein the at least one groove is formed at a position corresponding to a half-length of at least one long edge of the light guide plate.

23. The backlight assembly of claim 22, wherein the at least one support protrudes from a bottom surface of the lower cover and fitted into the at least one groove formed at the at least one long edge of the light guide plate.

24. The backlight assembly of claim 21, wherein the at least one support protrudes from a bottom surface of the lower cover.

25. A backlight assembly comprising:
a light guide plate having at least one groove formed on at least one side edge thereof;
at least one light source unit spaced apart from at least one side of the light guide plate to face the at least one groove; and
a lower cover including at least one peg-like support member integrally formed with an inner surface of the lower cover and protruding from the inner surface thereof to receive the at least one groove to position the light guide plate, the at least one peg-like support member being disposed on a same side that the at least one light source unit is disposed.

26. The backlight assembly of claim 25, wherein the at least one groove is formed at a position corresponding to a half-length of at least one long side edge of the light guide plate.

27. The backlight assembly of claim 25, the at least one light source unit including a plurality of light emitting diodes (LEDs) equally spaced apart from each other except two of the LEDs closest to the groove being spaced apart from each other by a greater distance.

28. The backlight assembly of claim 25, wherein the at least one peg-like support member comprises a cylindrical shape.

29. A display apparatus comprising:
a signal processing unit to process image signals received from outside the display apparatus;
a liquid crystal display panel to display an image according to the image signals received from the signal processing unit; and
the backlight assembly according to claim 25 to guide light to the liquid crystal panel.

30. The display apparatus of claim 29, wherein the liquid crystal display panel comprises a film transistor substrate, the signal processing unit being disposed at one side of the film transistor substrate to apply the image signals to the liquid crystal display panel.

31. The display apparatus of claim 29, wherein the signal processing unit comprises a flexible printed circuit board, a drive chip mounted on the flexible printed circuit board, and a circuit board connected to one side of the flexible printed circuit board.

* * * * *